United States Patent
Wang et al.

(10) Patent No.: US 9,203,851 B1
(45) Date of Patent: Dec. 1, 2015

(54) REDIRECTION OF DATA FROM AN ON-PREMISE COMPUTER TO A CLOUD SCANNING SERVICE

(71) Applicant: Trend Micro Incorporated, Tokyo (JP)

(72) Inventors: Chen Wang, Nanjing (CN); Yongjun Wei, Nanjing (CN); Yeli Xu, Nanjing (CN); Gongwei Qian, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/276,125

(22) Filed: May 13, 2014

(51) Int. Cl.
  *G06F 12/00* (2006.01)
  *H04L 29/06* (2006.01)
(52) U.S. Cl.
  CPC .................. *H04L 63/1408* (2013.01)
(58) Field of Classification Search
  USPC .......................................................... 726/22
  See application file for complete search history.

(56) References Cited

U.S. PATENT DOCUMENTS

| | | | |
|---|---|---|---|
| 8,510,838 B1 * | 8/2013 | Sun et al. ........................ | 726/24 |
| 8,595,803 B2 | 11/2013 | Zaitsev | |
| 2011/0251992 A1 | 10/2011 | Bethlehem et al. | |
| 2011/0321160 A1 * | 12/2011 | Mohandas et al. .............. | 726/22 |
| 2012/0066670 A1 | 3/2012 | McCarthy et al. | |

OTHER PUBLICATIONS

Sandbox (computer security)—Wikipedia, the free encyclopedia, 1 sheet [retrieved on Jun. 7, 2012], retrieved from the internet: http://en.wikipedia.org/wiki/Sandbox_%28computer_security%29.
Whitelist—Wikipedia, the free encyclopedia, 1 sheet [retrieved on Jun. 7, 2012], retrieved from the internet: http://en.wikipedia.org/wiki/Whitelist.
Policy-based routing—Wikipedia, the free encyclopedia, 2 sheets [retrieved on Jun. 7, 2012], retrieved from the internet: http://en.wikipedia.org/wiki/Policy-based_routing.
Code signing—Wikipedia, the free encyclopedia, 3 sheets [retrieved on Jun. 7, 2012], retrieved from the internet: http://en.wikipedia.org/wiki/Code_signing.
Split tunneling—Wikipedia, the free encyclopedia, 2 sheets [retrieved on Jun. 7, 2012], retrieved from the internet: http://en.wikipedia.org/wiki/Split_tunneling.
Virtual private network—Wikipedia, the free encyclopedia, 9 sheets [retrieved on Jun. 7, 2012], retrieved from the internet: http://en.wikipedia.org/wiki/Virtual_private_network.
On-Demand VPN Explained / Enterprise iOS, 4 sheets [retrieved on Jun. 7, 2012], retrieved from the internet: http://www.enterpriseios.com/wiki/On_Demand_VPN_Explained.

(Continued)

*Primary Examiner* — Amare F Tabor
(74) *Attorney, Agent, or Firm* — Okamoto & Benedicto LLP

(57) ABSTRACT

An on-premise computer in the form of an on-premise gateway receives data transmitted by a client to an intended destination server. The on-premise gateway and the client are on-premise within the same private computer network. The on-premise gateway determines whether or not the data is to be scanned for security checks by a cloud scanning service provided by a cloud scanner on the Internet. The on-premise gateway redirects the data to the cloud scanner when the data is to be scanned in the cloud. Otherwise, when the data is not to be scanned in the cloud, the on-premise gateway forwards the data to the destination server without having the data scanned by the cloud scanner.

20 Claims, 6 Drawing Sheets

(56) References Cited

OTHER PUBLICATIONS iOS for Business: Deployment VPN:: Apple iOS : VPN On-Demand explained, 7 sheets [retrived on Jun. 13, 2012], retrieved from the internet: http://www.ios4business.com/2011/05/12/apple-ios-vpn-on-demand-explained/.

RFC 2787—Generic Routing Encapsulation (GRE), 9 sheets [retrieved on Jun. 7, 2012], retrieved from the internet: http://tools.ietf.org/html/rfc2784.

* cited by examiner

REDIRECTION OF DATA FROM AN ON-PREMISE COMPUTER TO A CLOUD SCANNING SERVICE

BACKGROUND OF THE INVENTION

1. Field of the Invention

The present invention relates generally to computer security and more particularly but not exclusively to methods and systems for redirecting data to a cloud scanning service.

2. Description of the Background Art

Data may be scanned for various reasons relating to computer security including to detect computer viruses, unauthorized transfer of sensitive data, communication with prohibited servers, violation of security policies, and other computer security threats. Scanning data to perform security checks is especially troublesome for private computer networks with a relatively large number of users because of the volume of traffic traversing the network. A private computer network may maintain an on-premise, i.e. within the private computer network, scanning device to scan all network traffic transferred between computers within the private computer network and computers on the Internet. However, on-premise scanning devices typically have a fixed feature set that needs to be continually upgraded to accommodate additional users.

SUMMARY

In one embodiment, an on-premise computer in the form of an on-premise gateway receives data transmitted by a client to an intended destination server. The on-premise gateway and the client are on-premise within the same private computer network. The on-premise gateway determines whether or not the data is to be scanned for security checks by a cloud scanning service provided by a cloud scanner on the Internet. The on-premise gateway redirects the data to the cloud scanner when the data is to be scanned in the cloud. Otherwise, when the data is not to be scanned in the cloud, the on-premise gateway forwards the data to the destination server without having the data scanned by the cloud scanner.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
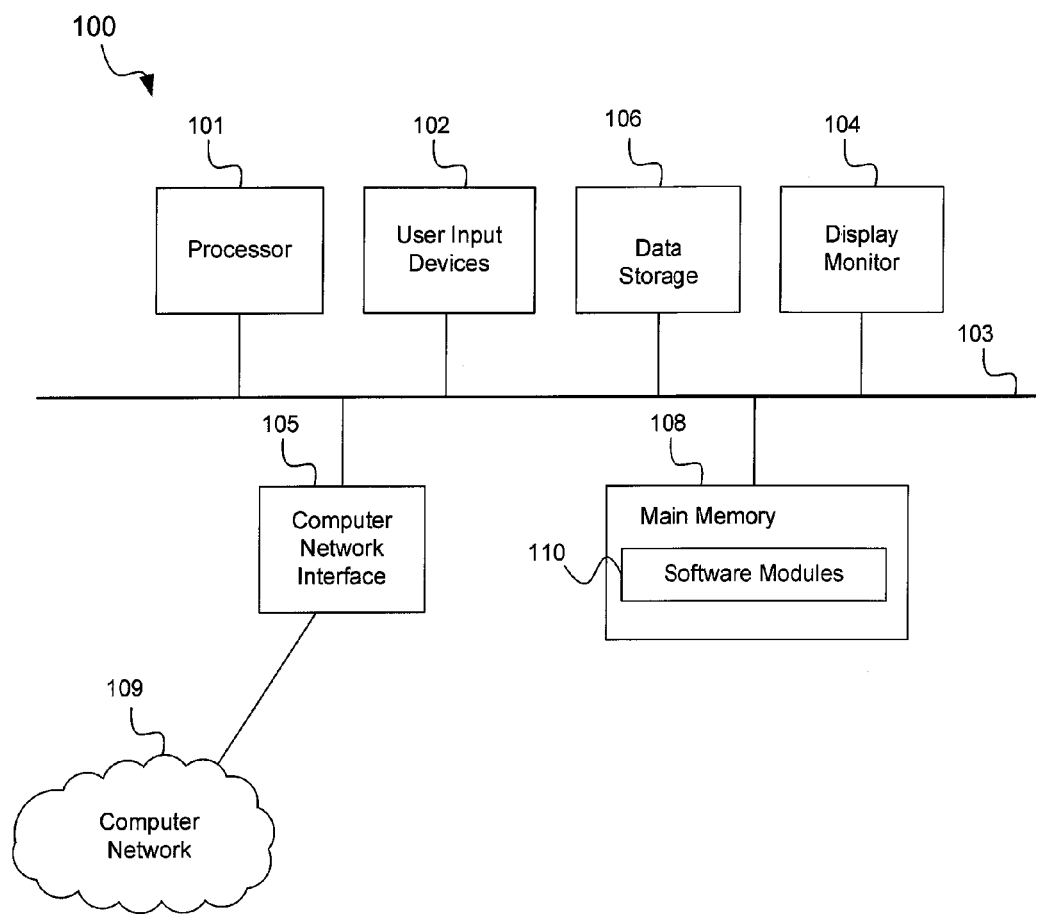
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as an on-premise gateway and other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109.

The computer 100 is a particular machine as programmed with software modules 110. The software modules 110 comprise computer-readable program code stored non-transitory in the main memory 108 for execution by the processor 101. As an example, the software modules 110 may comprise a local scanner and redirection module when the computer 100 is employed as an on-premise gateway.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
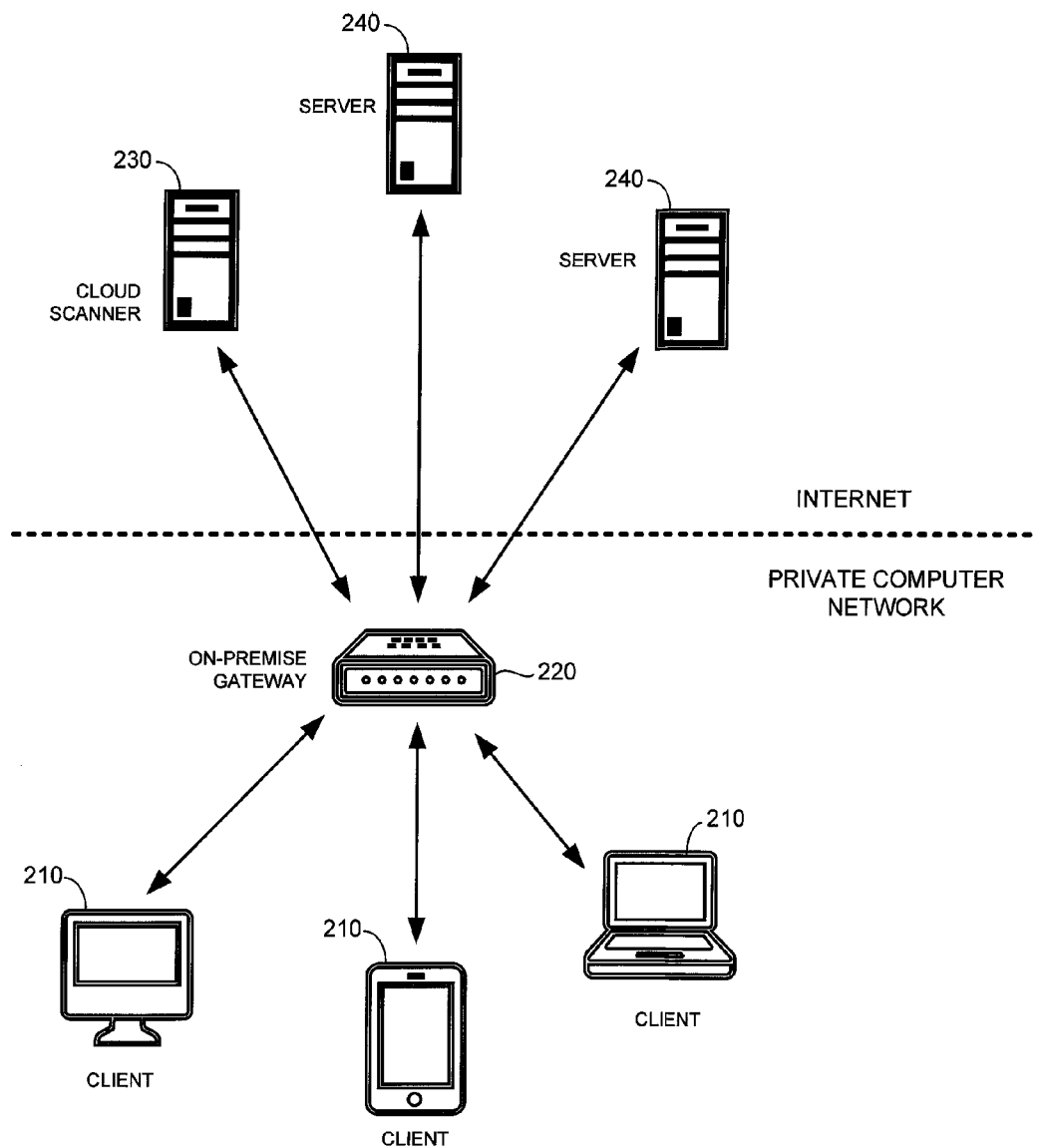
FIG. 2 shows a schematic diagram of a system for redirecting network traffic to a cloud scanning service in accordance with an embodiment of the present invention.

FIG. 2 shows a schematic diagram of a system for redirecting network traffic to a cloud scanning service in accordance with an embodiment of the present invention. In the example of FIG. 2, the system includes a plurality of clients 210, an on-premise gateway 220, a plurality of servers 240, and a cloud scanner 230. Other network devices, such as routers, are not shown for clarity of illustration.

In the example of FIG. 2, the on-premise gateway 220 and the plurality of clients 210 are within the perimeter of a private computer network. Accordingly, the on-premise gateway 220 and the plurality of clients 210 are on-premise within the private computer network. The plurality of servers 240 and the cloud scanner 230 are on the Internet in that they are accessible over the Internet.

The clients 210 may comprise desktop computers, laptop computers, notebook computers, tablets, and other user computers. The clients 210 may also comprise server computers that function as a client in a client-server communication. For example, a client 210 may comprise a server computer that requests data from a server 240.

The on-premise gateway 220 may comprise a computer (e.g., a network appliance, server computer, router) that provides clients 210 a gateway to the Internet. In one embodiment, all traffic from the clients 210 to the Internet go through the on-premise gateway 220. The on-premise gateway 220 may receive all traffic from the clients 210 to the Internet by routing, bridging, or proxy, for example. In one embodiment, the on-premise gateway 220 receives data from a client 210 over a network connection (e.g., Transmission Control Protocol (TCP) on the private computer network, locally scans the data in the on-premise gateway 220 to perform security checks on the data, and determines whether to redirect the data to the cloud scanner 230 for in-the-cloud scanning or to forward the data to a destination server 240 without in-the-cloud scanning. The on-premise gateway 220 may locally, i.e., in the on-premise gateway 220 as opposed to an external computer, scan the data to perform security checks on the data, such as to check the data for computer viruses and other security threats.

The cloud scanner 230 may comprise one or more computers for scanning data for security threats. The cloud scanner 230 is "in-the-cloud" in that it is accessible over the Internet. The cloud scanner 230 may be part of a conventional cloud scanning service, such as those provided by TREND MICRO, Inc. Generally speaking, cloud scanning services are computer security solutions that are hosted in the cloud. Cloud scanning services are appealing because they remove the need for a private computer network to maintain an on-premise computer to scan data. Embodiments of the present invention allow an on-premise computer, such as the on-premise gateway 220, to selectively redirect data to a cloud scanning service.

A server 240 may comprise a server computer with server software for servicing requests from the clients 210. A server 240 may be hosting a website, for example. A client 210 may send data to a server 240. A server 240 may be indicated as the intended destination of the data in a header, payload, field, or other portion of packets or other data unit conveying the data, for example.

Figure 3:
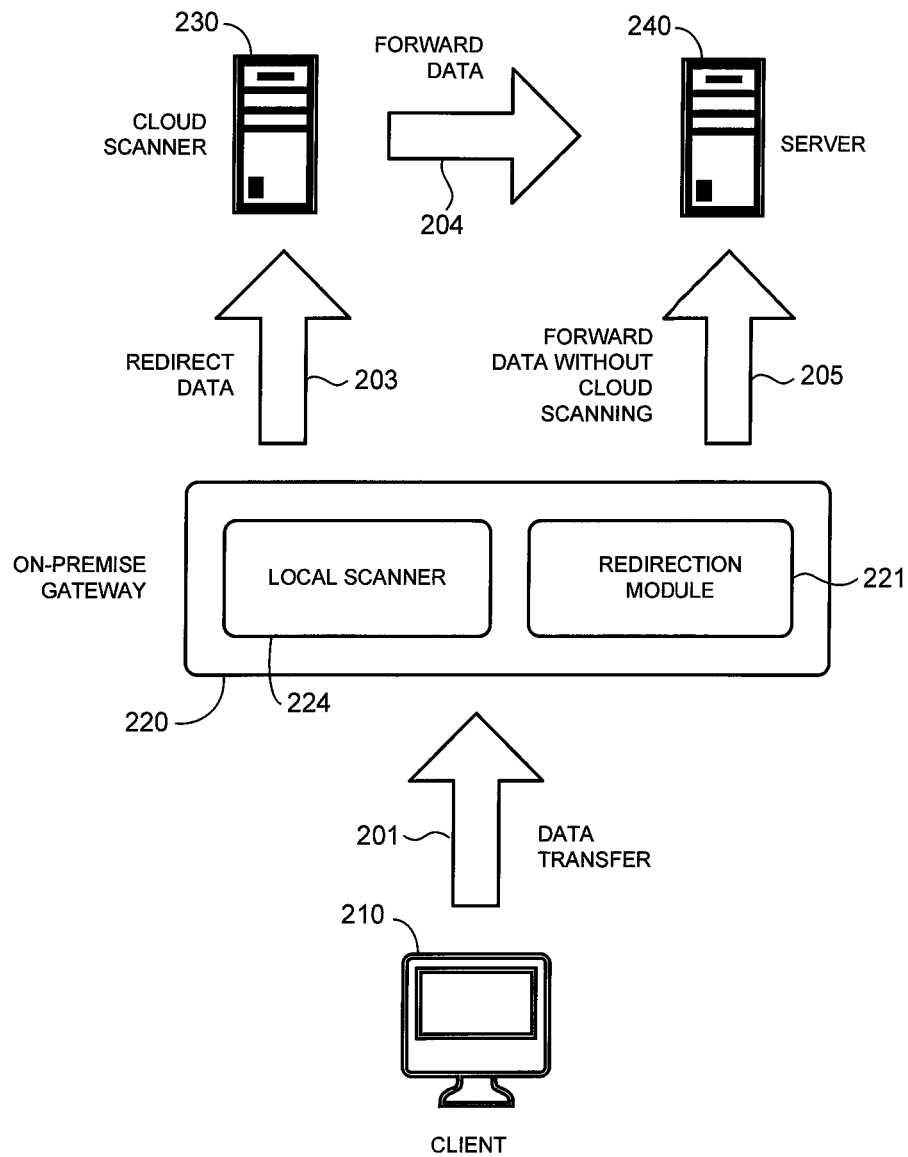
FIG. 3 shows a schematic diagram of an on-premise gateway in accordance with an embodiment of the present invention.

FIG. 3 shows a schematic diagram of the on-premise gateway 220 in accordance with an embodiment of the present invention. In the example of FIG. 3, the on-premise gateway 220 includes a redirection module 221 and a local scanner 224. In one embodiment, the redirection module 221 and the local scanner 224 are implemented as software executed by the processor of the on-premise gateway 220. As can be appreciated, the redirection module 221 and the local scanner 224 may also be implemented in hardware (e.g., application specific integrated circuit, field programmable logic) or combination of hardware and software.

In one embodiment, a client 210 sends data to an intended destination server 240. The redirection module 221 receives the data from the client 210 (see arrow 201), e.g., by routing, proxy, or some other way of transferring data to a particular computer. The redirection module 221 determines whether the data needs to be scanned in the cloud. If so, the redirection module 221 redirects the data to the cloud scanner 230 (see arrow 203), which scans the data and thereafter forwards the data to the destination server 240 (see arrow 204). The data is "redirected" to the cloud scanner 230 in that the data is forwarded to the cloud scanner 230 instead of being forwarded to its intended destination server 240. Otherwise, when the redirection module 221 determines that the data does not need to be scanned in the cloud, the redirection module 221 forwards the data directly to the intended destination of the data, i.e., the server 240, without going through the cloud scanner 230 (see arrow 205).

In one embodiment, the redirection module 221 determines whether the data needs to be scanned in the cloud based on one or more redirection criteria, such as the type of application that originated the data, the TCP port for the data (e.g., port 80 or 443), the Uniform Resource Locator (URL) of the destination server 240, the source/destination Internet Protocol (IP) address of the packets carrying the data, the system time and day the data was received in the on-premise gateway 220, the scanning capacity (e.g., processing load) of the on-premise gateway 220, etc. As a particular example, the redirection module 221 may be configured to redirect to the cloud scanner 230 for in-the-cloud scanning all data that are received or sent through TCP port 80 or 443. As another example, the redirection module 221 may be configured to redirect to the cloud scanner 230 for in-the-cloud scanning all data that are going to a server with a particular URL. Yet another example, the redirection module 221 may be configured to send all data to the cloud scanner 230 for in-the-cloud scanning when the on-premise gateway 220 is running low on processing resources. And yet another example, the redirection module 221 may be configured to directly send all data going to a predetermined trusted server (e.g., as identified by URL or IP address) without going through the cloud scanner 230. The redirection module 221 may also employ other criteria in determining whether data needs to be scanned in the cloud without detracting from the merits of the present invention.

The redirection module 221 forwards the data to the local scanner 224, which scans the data for computer viruses and other security threats. The local scanner 224 may employ conventional scanning algorithms generally employed in antivirus, network intrusion detection, data leakage protection, and other computer security applications. In one embodiment, data received from the client 210 is scanned by the local scanner 224 regardless of whether or not the data will be sent to the cloud scanner 230 for in-the-cloud scanning. That is, in that embodiment, the local scanner 224 scans all data received from the clients 210. The local scanner 224 may change the amount of scanning performed on the data based on the scanning capacity (e.g., processing load) of the on-premise gateway 220 at the time the data is received. For example, the local scanner 224 may scan the data for antivirus, data leakage protection, anti-spam, and additional computer security checks when the on-premise gateway 220 is mostly idle. In that example, the local scanner 224 may scan the data only for data leakage protection when the on-premise gateway 220 is busy.

Figure 4:
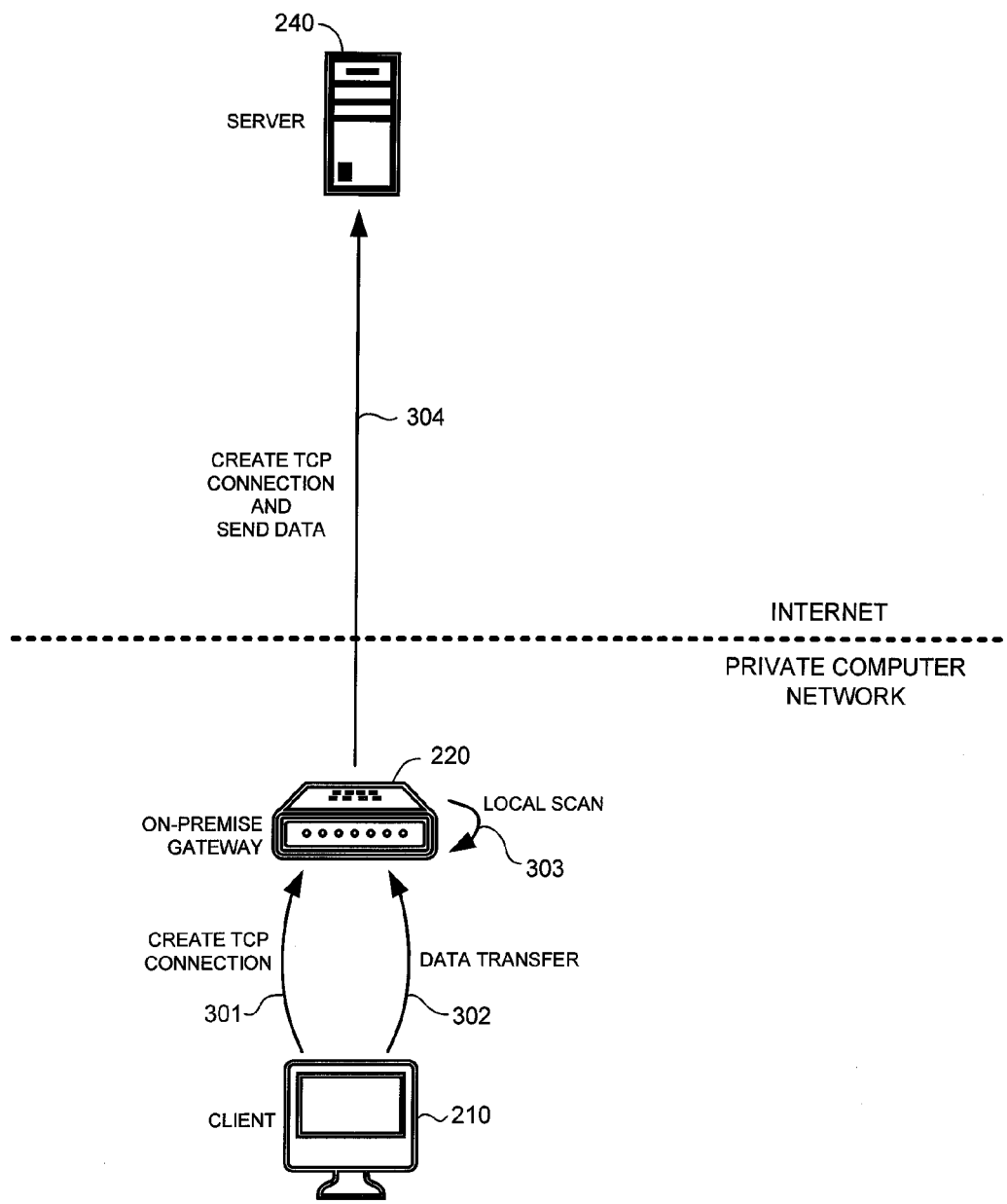
FIG. 4 shows a flow diagram that illustrates an example operation of the system of FIG. 2 in the case when data that is received from a client does not need to be scanned in the cloud.

FIG. 4 shows a flow diagram that illustrates an example operation of the system of FIG. 2 in the case when data that is received from a client 210 does not need to be scanned in the cloud. In the example of FIG. 4, a client 210 creates a network connection (e.g., TCP connection) to the on-premise gateway 220 (see arrow 301). The client 210 thereafter proceeds to transfer the data to the on-premise gateway 220 over the network connection (see arrow 302). The on-premise gateway 220 locally scans the data to perform security checks on the data, such as to check the data for computer viruses and other security threats (see arrow 303). The on-premise gateway 220 determines whether or not the data needs to be scanned in the cloud. In the example of FIG. 4, the on-premise gateway 220 determines that the data does not need to be scanned in the cloud. In response to determining that the data does not need to be scanned in the cloud, the on-premise gateway 220 creates a network connection to the intended destination of the data, which in this example is a server 240 (see arrow 304). The on-premise gateway 220 forwards the data directly to the server 240. As can be appreciated, the data is sent "directly" to the server 240 because the data is not redirected to the cloud scanner 230. However, the data may still pass through routers, other servers, etc. on its way to the server 240.

In the reverse direction, incoming data from the server 240 to the client 210 is transmitted by the server 240 to the on-premise gateway 220 over the existing network connection between the server 240 and the on-premise gateway 220. The on-premise gateway 220 may scan the incoming data to perform security checks on the incoming data before forwarding the incoming data to the client 210 over the existing network connection between the on-premise gateway 220 and the client 210.

Figure 5:
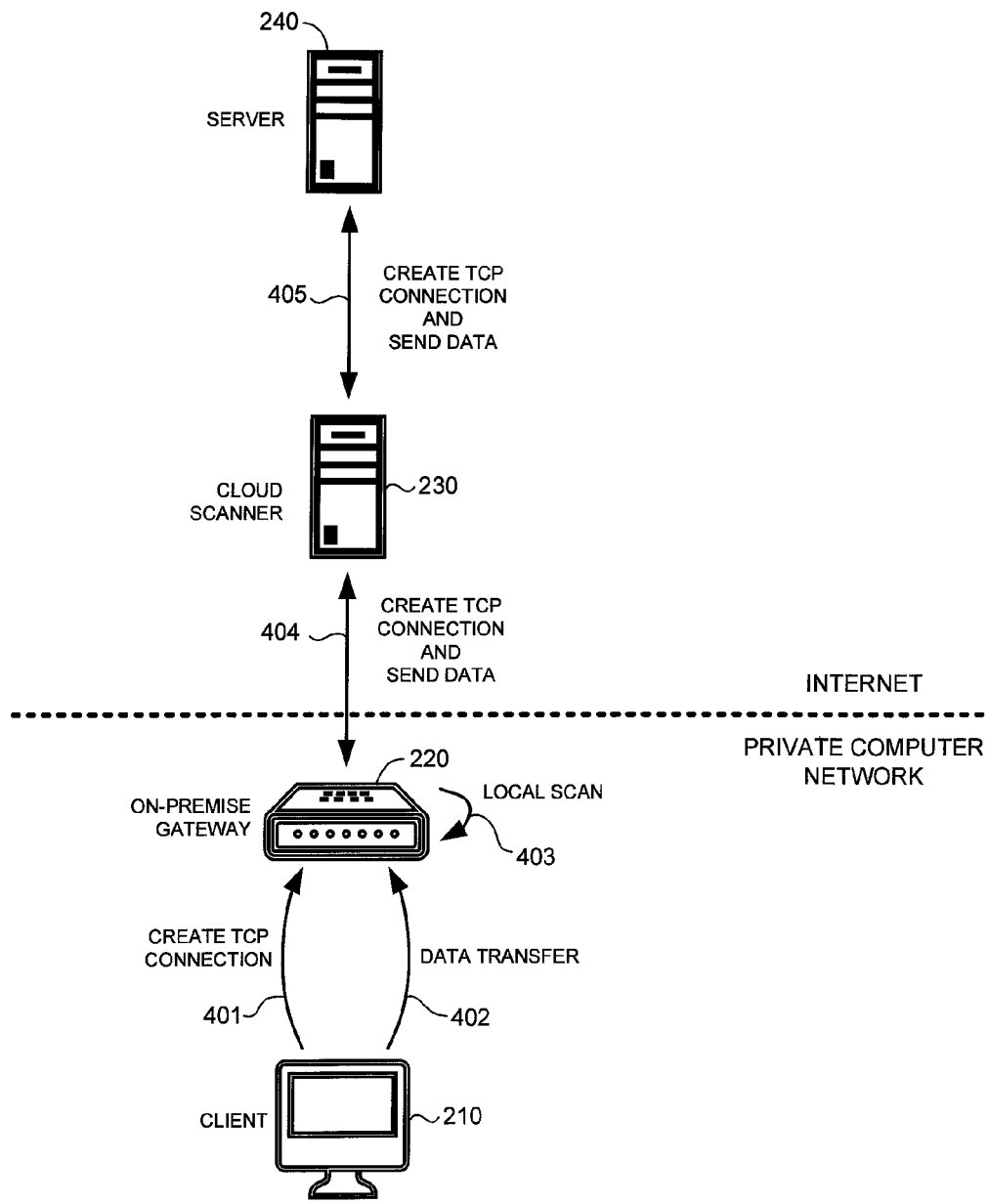
FIG. 5 shows a flow diagram that illustrates an example operation of the system of FIG. 2 in the case when data that is received from a client needs to be scanned in the cloud.

FIG. 5 shows a flow diagram that illustrates an example operation of the system of FIG. 2 in the case when data that is received from a client 210 needs to be scanned in the cloud. FIG. 5 shows an example where the client 210 connects to the on-premise gateway 220, which connects to the cloud scanner 230, which in turn connects to the server 240. In another embodiment, the client 210 may create a connection to the on-premise gateway 220, which creates a connection to the server 240 to make sure the server 240 is available. In that embodiment, after the on-premise gateway 220 determines to redirect data to the cloud scanner 230, the on-premise gateway 220 may close the connection to the server 240 and create a connection to the cloud scanner 230, which creates a connection to the server 240. Other connection configurations are also possible without detracting from the merits of the present invention.

In the example of FIG. 5, the client 210 creates a network connection (e.g., TCP connection) to the on-premise gateway 220 (see arrow 401). The client 210 thereafter proceeds to transfer data to the on-premise gateway 220 over the network connection (see arrow 402). The on-premise gateway 220 locally scans the data to perform security checks on the data, such as to check the data for computer viruses and other security threats (see arrow 403). The on-premise gateway 220 determines whether or not the data needs to be scanned in the cloud. In the example of FIG. 5, the on-premise gateway 220 determines that the data needs to be scanned in the cloud. In response to determining that the data needs to be scanned in the cloud, the on-premise gateway 220 creates a network connection (e.g., TCP connection) to the cloud scanner 230 and redirects the data to the cloud scanner 230 over the network connection (see arrow 404).

The cloud scanner 230 scans the data for computer security threats. The cloud scanner 230 typically has more processing resources than the on-premise gateway 220 and accordingly can perform more thorough scan of the data. Therefore, it is advantageous to be able to send the data to the cloud scanner 230 for in-the-cloud scanning even when the data has already been scanned locally in the on-premise gateway 220. After scanning data, the cloud scanner 230 creates a network connection (e.g., TCP connection) to the destination server 240 and transfers the data to the server 240 over the network connection (see arrow 405).

In the reverse direction, incoming data from the server 240 to the client 210 is transmitted by the server 240 to the cloud scanner 230 over the existing network connection between the server 240 and the cloud scanner 230. The cloud scanner 230 performs security checks on the incoming data before forwarding the incoming data to the on-premise gateway 220 over the existing network connection between the cloud scanner 230 and the on-premise gateway 220. The on-premise gateway 220 may perform security checks on the incoming data before forwarding the incoming data to the client 210 over the existing network connection between the on-premise gateway 220 and the client 210.

Figure 6:
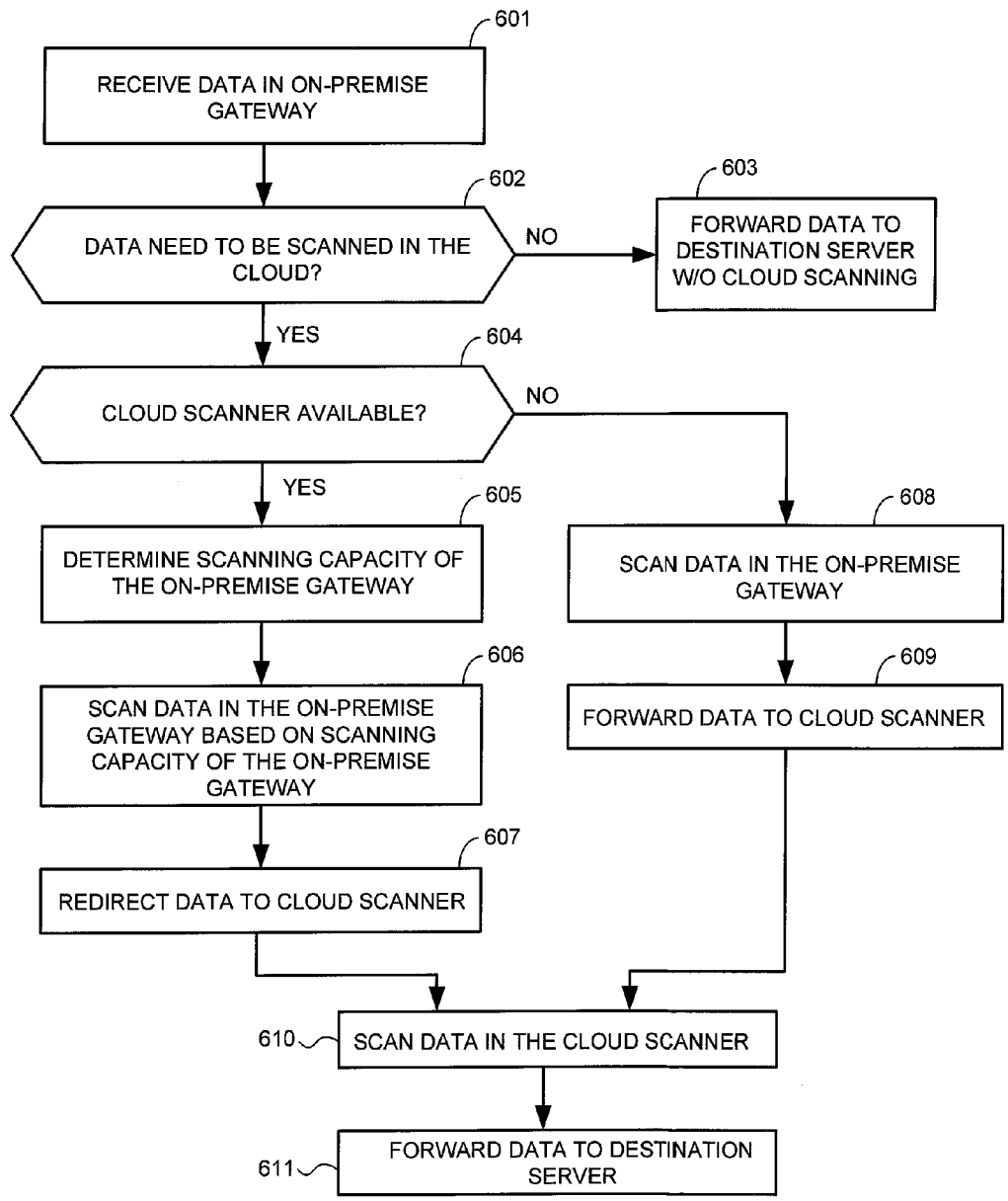
FIG. 6 shows a flow diagram of a computer-implemented method of redirecting data to a cloud scanning service in accordance with an embodiment of the present invention.

FIG. 6 shows a flow diagram of a computer-implemented method of redirecting data to a cloud scanning service in accordance with an embodiment of the present invention. The method of FIG. 6 is explained using previously described components. As can be appreciated, other components may also be employed without detracting from the merits of the present invention.

In the example of FIG. 6, a client 210 creates a network connection to the on-premise gateway 220 and sends data to the on-premise gateway 220 over the network connection. The on-premise gateway 220 receives the data over the network connection (step 601) and makes a determination as to whether or not the data needs to be scanned in the cloud (step 602). When the data does not need to be scanned in the cloud, the on-premise gateway 220 forwards the data to its intended destination without scanning the data in the cloud (step 602 to step 603). In that case, the on-premise gateway 220 forwards the data to the intended destination server 240 without redirecting the data to the cloud scanner 230. This may be the case when the data does not need to be scanned in the cloud because the data is not important, going to a trusted server (e.g., in a whitelist), or other reasons.

When the data needs to be scanned in the cloud, the on-premise gateway 220 makes a determination as to whether or not the cloud scanner 230 is available (step 602 to step 604). For example, the redirection module 221 of the on-premise gateway 220 (see FIG. 3) may attempt to create a network connection to the cloud scanner 230 to check if the cloud scanner 230 is online. If a network connection between the on-premise gateway and the cloud scanner 230 can be established, the redirection module 221 may deem the cloud scanner 230 to be available. Otherwise, when a network connection cannot be established between the on-premise gateway 220 and the cloud scanner 230, the redirection module 221 may deem the cloud scanner 230 to be unavailable. As another example, a watchdog or heartbeat status monitoring may be established between the on-premise gateway 220 and the cloud scanner 230 to determine whether or not the cloud scanner 230 is available.

When the cloud scanner 230 is available, the redirection module 221 forwards the data to the local scanner 224, which determines the scanning capacity of the on-premise gateway 220 (step 604 to step 605). For example, the local scanner 224 may determine the processor or memory utilization of the on-premise gateway 220 to determine its scanning capacity. The local scanner 224 locally scans the data to perform one or more security checks on the data based on the scanning capacity of the on-premise gateway 220 (step 606). For example, the local scanner 224 may perform all available security checks when the on-premise gateway 220 is not busy and perform only a subset of the available security checks when the on-premise gateway 220 is busy. The on-premise gateway 220 thereafter redirects the data to the cloud scanner 230 (step 607).

When the cloud scanner 230 is not available, the redirection module 221 so informs the local scanner 224 and forwards the data to the local scanner 224 (step 604 to step 608). The local scanner 224 locally scans the data to perform security checks on the data (step 608). This time, because the data will not be scanned in the cloud, the local scanner 224 may scan the data to perform all available security checks. The on-premise gateway 220 thereafter forwards the data to cloud scanner 230 (step 609).

The cloud scanner 230 scans the data received from the on-premise gateway 220 and performs security checks on the data (step 610) before forwarding the data to the destination server 240 (step 611). As can be appreciated, the on-premise gateway 220 and/or the cloud scanner 230 may perform a security action in response to detecting a security threat in the data. For example, the on-premise gateway 220 and/or the cloud scanner 230 may block and quarantine the data instead of forwarding the data to the destination server 240 when the data is infected with computer virus. Other responsive security actions may be performed without detracting from the merits of the present invention.

Methods and systems for redirecting data from an on-premise computer to a cloud scanning service have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of redirecting data to a cloud scanning service, the method comprising:
    an on-premise gateway receiving data from a client over a private computer network, the on-premise gateway and the client being on-premise within the private computer network;
    the on-premise gateway locally scanning the data in the on-premise gateway to perform security checks on the data;
    the on-premise gateway determining whether the data is to be scanned in a cloud scanner accessible over the Internet for security checks, the cloud scanner providing a cloud scanning service; and
    after locally scanning the data in the on-premise gateway, the on-premise gateway redirecting the data to the cloud scanner instead of forwarding the data to an intended destination server of the data when the on-premise gateway determines that the data is to be scanned in the cloud scanner.

2. The computer-implemented method of claim 1, further comprising:
    the on-premise gateway determining whether the cloud scanner is available; and
    the on-premise gateway performing only a subset of available security checks on the data when the cloud scanner is available.

3. The computer-implemented method of claim 2, further comprising:
    the on-premise gateway performing all available security checks on the data when the cloud scanner is not available.

4. The computer-implemented method of claim 1, wherein the client comprises a user computer.

5. The computer-implemented method of claim 1, further comprising:
    the cloud scanner scanning the data to perform security checks on the data and thereafter forwarding the data to the intended destination server.

6. The computer-implemented method of claim 1, wherein the on-premise gateway receives the data from the client over a transmission control protocol (TCP) network connection.

7. The computer-implemented method of claim 1, wherein the on-premise gateway receives all network traffic between computers in the private computer network and computers on the Internet.

8. A system for redirecting network traffic to a cloud scanning service, the system comprising:
    an on-premise gateway that is on-premise in a private computer network, receives data from a client over the private computer network, locally scans the data in the on-premise gateway to perform security checks on the data, determines whether the data is to be scanned in a cloud scanner accessible over the Internet for security checks, and, after locally scanning the data in the on-premise gateway, redirects the data to the cloud scanner instead of forwarding the data to an intended destination server of the data when the on-premise gateway determines that the data is to be scanned in the cloud scanner.

9. The system of claim 8, wherein the on-premise gateway determines whether the cloud scanner is available and performs only a subset of available security checks on the data when the cloud scanner is available.

10. The system of claim 9, wherein the on-premise gateway performs all available security checks on the data when the cloud scanner is not available.

11. The system of claim 8, further comprising:
    the cloud scanner that scans the data to perform security checks on the data and thereafter forwards the data to the intended destination server.

12. The system of claim 11, further comprising:
    the client that comprises a user computer.

13. The system of claim 8, wherein the on-premise gateway receives all network traffic between computers in the private computer network and computers on the Internet.

14. The system of claim 8, wherein the on-premise gateway receives the data from the client over a transmission control protocol (TCP) network connection.

15. A computer-implemented method of redirecting data to a cloud scanning service, the method comprising:
    receiving data in a computer that is on-premise in a private computer network, the data being received from an other computer that is on-premise in the private computer;
    determining whether the data is to be scanned by a cloud scanning service on the Internet for security checks; and
    after locally scanning the data in the computer, redirecting the data to the cloud scanning service instead of forwarding the data to an intended destination server of the data when the data is to be scanned by the cloud scanning service.

16. The computer-implemented method of claim 15, further comprising:
    determining whether the cloud scanning service is available; and
    performing only a subset of available security checks on the data in the computer when the cloud scanning service is available.

17. The computer-implemented method of claim 16, further comprising:
    performing all available security checks on the data in the computer when the cloud scanning service is not available.

18. The computer-implemented method of claim 15, wherein the client comprises a user computer.

19. The computer-implemented method of claim 15, further comprising:
    the cloud scanning service scanning the data to perform security checks on the data and thereafter forwarding the data to the intended destination server.

20. The computer-implemented method of claim 15, wherein the computer receives all network traffic between computers in the private computer network and computers on the Internet.

* * * * *